US008670859B2

(12) United States Patent
Hrachovec et al.

(10) Patent No.: US 8,670,859 B2
(45) Date of Patent: Mar. 11, 2014

(54) METHODS AND APPARATUS FOR AN IMPROVED MOTOR CONTROL CENTER

(75) Inventors: Dale R. Hrachovec, Dahlongega, GA (US); Pablo A. Medina Rios, Duluth, GA (US); Jason A. Cange, North Aurora, IL (US); Seshagiri R. Marellapudi, Norcross, GA (US); Barry E. Powell, Roswell, GA (US); Ayman S. El-Dinary, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 820 days.

(21) Appl. No.: 12/832,956

(22) Filed: Jul. 8, 2010

(65) Prior Publication Data

US 2011/0022751 A1    Jan. 27, 2011

Related U.S. Application Data

(60) Provisional application No. 61/224,093, filed on Jul. 9, 2009.

(51) Int. Cl.
*G06F 19/00* (2011.01)
*G05B 11/01* (2006.01)
*G05B 19/42* (2006.01)
*G05B 19/408* (2006.01)
*G05B 19/18* (2006.01)

(52) U.S. Cl.
USPC ............ 700/170; 700/18; 700/86; 700/87; 700/181; 318/568.1; 318/568.23

(58) Field of Classification Search
USPC ............ 700/9, 18, 86–87, 170, 181, 264; 318/568.1, 568.23
See application file for complete search history.

(56) References Cited

U.S. PATENT DOCUMENTS

| | | | |
|---|---|---|---|
| 5,225,987 A | | 7/1993 | Thompson |
| 5,347,553 A | * | 9/1994 | Scarola et al. ............... 376/259 |
| 5,672,943 A | | 9/1997 | Vivers |
| 6,032,203 A | | 2/2000 | Heidhues |
| 6,160,365 A | * | 12/2000 | Younger et al. ............... 318/16 |
| 6,252,365 B1 | | 6/2001 | Marple et al. |
| 6,556,950 B1 | * | 4/2003 | Schwenke et al. ............ 702/183 |
| 6,862,553 B2 | * | 3/2005 | Schwenke et al. ............ 702/183 |
| 6,901,316 B1 | * | 5/2005 | Jensen et al. .................. 700/286 |
| 7,262,943 B2 | * | 8/2007 | Stellato et al. .................. 361/62 |
| 7,266,476 B2 | * | 9/2007 | Coburn et al. ................ 702/183 |
| 7,529,599 B1 | * | 5/2009 | Bhatt et al. ................... 700/250 |
| 7,612,582 B2 | * | 11/2009 | Ward ............................. 326/38 |
| 2002/0174264 A1 | * | 11/2002 | Fuller et al. .................. 709/321 |
| 2003/0182083 A1 | * | 9/2003 | Schwenke et al. ............ 702/183 |
| 2007/0174518 A1 | | 7/2007 | Chandhoke |
| 2008/0058962 A1 | * | 3/2008 | Ward ............................. 700/17 |

FOREIGN PATENT DOCUMENTS

| | | |
|---|---|---|
| EP | 0929056 A2 | 7/1999 |
| EP | 1420308 A2 | 5/2004 |
| EP | 1574922 A2 | 9/2005 |
| WO | WO 0165324 A1 | 9/2001 |

* cited by examiner

*Primary Examiner* — Ramesh Patel

(57) ABSTRACT

Methods, apparatus, and systems are provided for operating a motor control center. The invention includes determining a hardware configuration of functional modules within a motor control center; downloading the hardware configuration to a programmable logic controller; configuring a program to run on the programmable logic controller based on the hardware configuration; and executing the program. Numerous additional aspects are disclosed.

21 Claims, 6 Drawing Sheets

METHODS AND APPARATUS FOR AN IMPROVED MOTOR CONTROL CENTER

CROSS-REFERENCE TO RELATED APPLICATIONS

The present application claims priority to U.S. Provisional Patent Application No. 61/224,093, entitled "Siemens Smart Motor Control Center PLC Unit," filed Jul. 9, 2009, which is herein incorporated by reference in its entirety. All literature and similar materials cited or referenced in the priority application, including but not limited to, patents, patent applications, articles, books, treatises, and internet web pages, regardless of the format of such literature and similar materials, are expressly incorporated by reference in their entirety for any purpose.

FIELD OF THE INVENTION

The present invention generally relates to motor control centers, and more particularly to using programmable logic controllers to control and monitor motor control center components.

BACKGROUND OF THE INVENTION

Motor Control Centers (MCCs) are used to provide modular, centralized control over large industrial motors such as those used in manufacturing robots and heavy machinery. MCCs typically include various different types of functional units or modules such as motor overload sensors, soft starters, variable frequency drives, etc. The functional modules are housed in a centralized enclosure and are coupled to corresponding motors. Such MCCs and their component modules are designed to be very reliable, very fast, and as inexpensive as possible. Particularly because of the high power switching involved, MCCs must be reliable in order to be safe. Further, MCCs are typically used in real time applications and thus, MCCs must have very fast and consistent response times. Conventionally, in order to meet these requirements, MCCs have been kept very simple and the processing capabilities have been restricted to basic functionality than can be implemented with relatively simple logic and deterministic response times. However, there is a need for more sophisticated monitoring and control over motors and the various types of functional units used within MCCs.

SUMMARY OF THE INVENTION

The embodiments of the present invention generally relate to methods and apparatus for operating MCCs, and more particularly, to operation of controllers for monitoring and controlling MCCs.

In some embodiments, the present invention provides a method of operating a motor control center. The method includes determining a hardware configuration; downloading the hardware configuration to a programmable logic controller; configuring a program to run on the programmable logic controller based on the hardware configuration; and executing the program.

In some other embodiments, the present invention provides a motor control center system. The motor control center system includes a frame adapted to provide a plurality of functional module slots; a busbar coupled to the frame and the functional module slots; a network coupled to the frame and the functional module slots; a programmable logic controller module adapted to couple to a functional module slot; and a plurality of functional modules adapted to couple to functional modules slots. The programmable logic controller module includes a programmable logic controller adapted to receive a hardware configuration; download the hardware configuration into a memory of the programmable logic controller; configure a program to run on the programmable logic controller based on the hardware configuration; and execute the program.

In still yet other embodiments, the present invention provides a programmable logic controller module for a motor control center. The programmable logic controller module includes a programmable logic controller adapted to receive a hardware configuration; download the hardware configuration into a memory of the programmable logic controller; configure a program to run on the programmable logic controller based on the hardware configuration; and execute the program.

These and other features and aspects of the present invention will become more fully apparent from the following detailed description of exemplary embodiments, the appended claims and the accompanying drawings.

BRIEF DESCRIPTION OF THE DRAWINGS

An artisan of ordinary skill will understand that the drawings, described below, are for illustration purposes only. The drawings are not intended to limit the scope of the present teachings in any way.

DETAILED DESCRIPTION

For the purpose of interpreting this specification, whenever appropriate, terms used in the singular will also include the plural and vice versa. The use of "or" is intended to mean "and/or" unless stated otherwise. The use of "a" herein is intended to mean "one or more" unless stated otherwise or where the use of "one or more" is clearly inappropriate. The use of "comprise," "comprises," "comprising," "include," "includes," and "including" are interchangeable and not intended to be limiting. Furthermore, where the description of one or more embodiments uses the term "comprising," those of ordinary skill in the art would understand that, in some specific instances, the embodiment or embodiments can be alternatively described using the language "consisting essentially of" and/or "consisting of."

While the present teachings are described in conjunction with various embodiments, it is not intended that the present teachings be limited to such embodiments. On the contrary, the present teachings encompass various alternatives, modifications, and equivalents, as will be appreciated by those of ordinary skill in the art.

The present invention provides an improved method of operating an MCC. According to embodiments of the present invention, a programmable logic controller (PLC) is provided that is adapted to detect and react to the presence or absence of functional modules and still continue to operate the MCC even if one or more functional modules are missing, misconfigured, or inoperative. Further, the PLC executes a program that is adapted to dynamically configure the MCC to use the detected functional modules. The program is able to draw upon a library of predefined data structures that each correspond to a different functional module and standardize communication with, and control of, the functional modules. Thus, third party interface software can access and control the functional modules in a manner similar to the way an application program may access a lower level program via a software application programming interface (API). Unlike such conventional software systems however, the present invention is adapted to facilitate access and control the functional module hardware in a real time environment within predefined timeframes.

Figures 1, 1A:
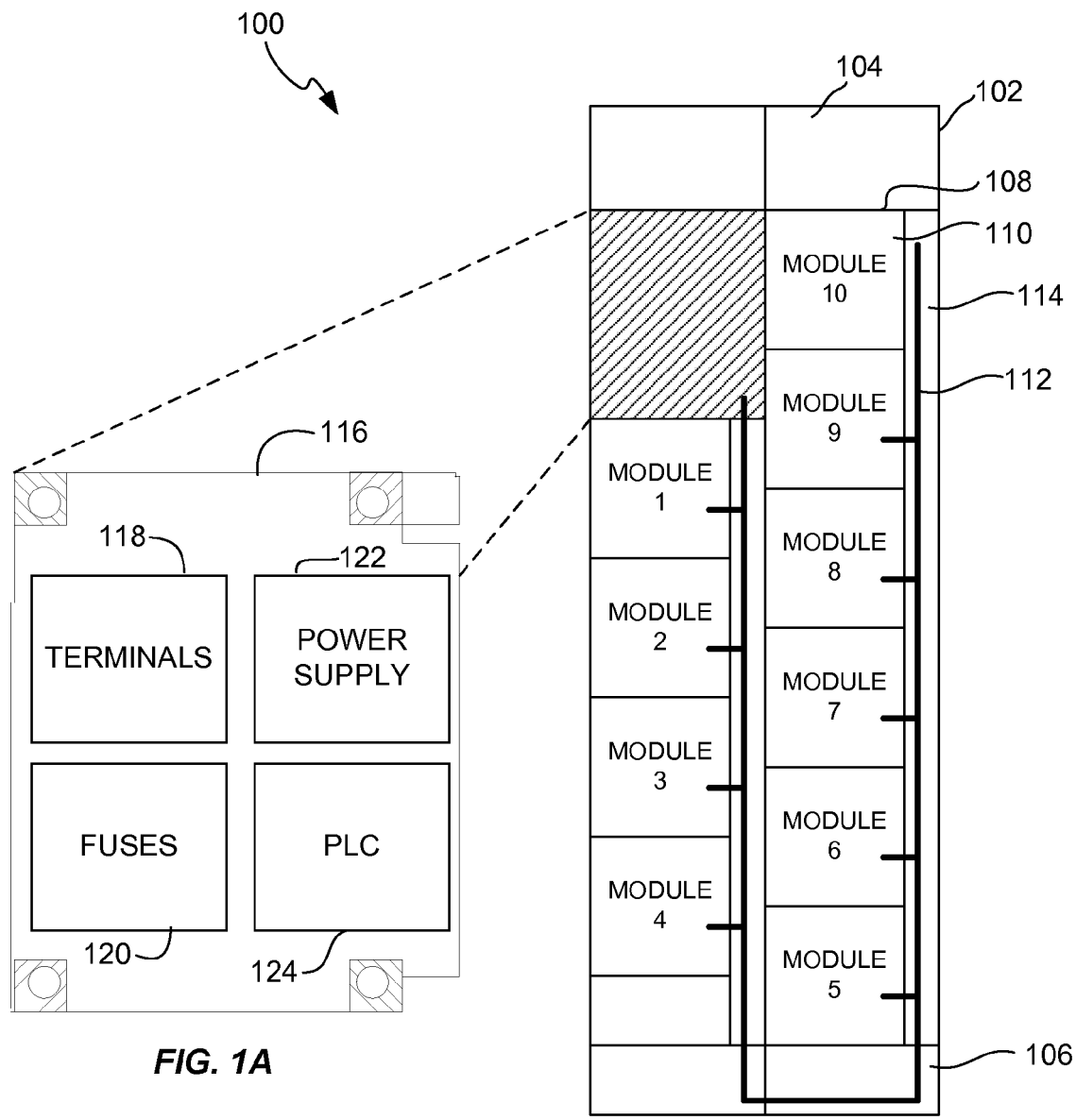
FIG. 1 is a schematic view of an example motor control center according to some embodiments of the present invention.
FIG. 1A is an enlarged schematic view of an example programmable logic controller module according to some embodiments of the present invention.

Turning to FIG. 1, an example motor control center 100 is depicted. The example MCC 100 includes a frame 102 (e.g., a vertical structure for mounting components) that can be, for example, wall, ceiling, floor, or rack mounted. The frame 102 houses three-phase busbars (not shown) that may span the length of the frame 102 and facilitate power distribution. In some embodiments, the busbars may additionally span the MCC 100 horizontally in, for example, a top portion 104 of the MCC 100 while a bottom portion 106 of the MCC 100 may include an access area for wiring installation. In some embodiments this arrangement may be reversed and/or both the horizontal bus bars and the access area may be disposed adjacent each other at either end of the MCC 100.

Functional module slots 108 (only one labeled with a reference numeral) are disposed along the length of the frame 102. In some embodiments, the functional module slots 108 may be arranged in multiple vertical columns (e.g., two columns are shown in the example of FIG. 1). The slots 108 are adapted to receive functional modules 110 (also known as configurable units or buckets). The functional modules 110 (only one labeled with a reference numeral in FIG. 1) may include various different types. For example, the functional modules 110 may include motor overload sensors, soft starter circuits, variable frequency drivers, low voltage breakers, power monitoring circuits, etc. Examples of such functional modules 110 include Model SIMOCODE (a motor overload sensor), Model MM440 (a variable frequency driver), Model 3RW44 (a soft starter circuit), Model 3WL (a low voltage circuit breaker), and Models PAC3200 and 9300 (power monitoring devices) each of which is manufactured by, and commercially available from, Siemens Energy & Automation, Inc. headquartered in Alpharetta, Ga. In some embodiments, the slots 108 and the corresponding functional modules 110 may have standardized dimensions (e.g., 12 or 18 inch height) and form factors to facilitate the modularity of the hardware. In other words, the MCC 100 may be adapted to allow any of the functional modules 110 to be inserted onto any of the slots 108.

By inserting a functional module 110 into a slot 108, a connection between the MCC 100 and the functional module 110 is established. This may include both a connection to the busbar as well as to a network 112 (e.g., a data network) that couples all of the slots 108 together to facilitate communication with installed functional modules 110. Thus the functional modules may include communications facilities (e.g., network communications ports, serial ports, Ethernet ports, USB ports, etc.). The network 112 may be disposed within one or more wire-ways 114 that span the length of the frame 102. In some embodiments, the wire-ways 114 may be disposed along the sides and/or in the middle of the MCC 100. In addition, the wire-ways may also contain wiring from the functional modules 110 to motors in the field.

Looking at both FIG. 1 and FIG. 1A now, the MCC 100 also includes a PLC module 116 that can be inserted into a slot 108. Note that the PLC module 116 depicted in FIG. 1A is enlarged to show the details of the PLC module 116. In some embodiments, the PLC module 116 maybe inserted into any slot 108 and in others, a special slot 108 maybe provided for the PLC module 116. The PLC module 116 may include several components. For example, the PLC module 116 may include terminals 118 for coupling to the network 112 as well as to an external network (not shown). In some embodiments, the external network may be an Ethernet network or other type of network. The terminals 118 may also include power terminals for coupling the PLC module 116 to the motors. Power terminals may include short circuit protection fuses 120. A power supply 122 for the PLC 124 itself may also be included. The PLC 124 may be, for example, a Model S7-315-2DP/PN manufactured by, and commercially available from, Siemens Energy & Automation, Inc. The PLC 124 includes a controller and internal memory for storing and executing a PLC program which will be described in more detail below.

In some embodiments, the functional modules 110 may be inserted into any available slot 108 and the MCC may address the functional modules 110 using a logical address and not a physical address. The use of logical addressing facilitates automated configuration of the functional modules 110. Thus, in such embodiments, a hardware configuration definition need not specify a physical location of the functional modules 110.

In operation, the functional modules 110 are adapted to be inserted and removed from the slots 108 without requiring shutting down power to the motors connected to the MCC 100. Control of the PLC 124 may be accomplished via a human machine interface (HMI) 210 (see FIG. 2) that is coupled to the PLC 124 via the external network. As will be explained in more detail below, the PLC 124 is adapted to detect and gather data from the functional modules 110 via the network 112. The PLC 124 is further designed to receive control information from the HMI 210 and use the control information to operate and/or monitor the functional modules 110.

Figure 2:
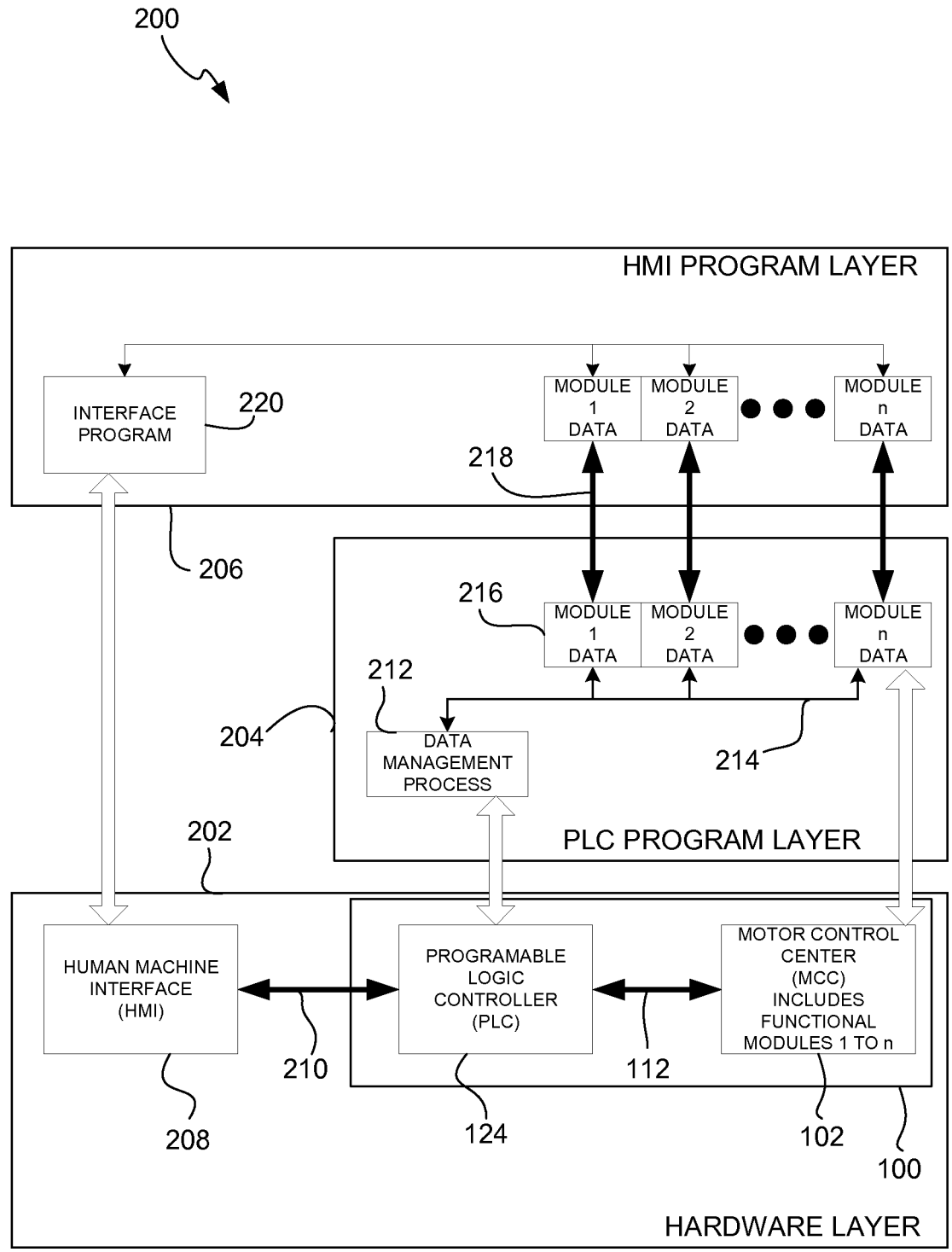
FIG. 2 is a block diagram depicting an example of a system architecture of a motor control center including a programmable logic controller module according to some embodiments of the present invention.

Turning now to FIG. 2, an example system architecture 200 for an MCC 100 is depicted. In some embodiments, the system 200 may be thought of as a three layer stack with a hardware layer 202 on the bottom, a PLC program layer 204 above the hardware layer 202, and a HMI program layer 206 on top of the PLC program layer 204. In the example system 200 shown, each layer provides an abstraction of the layer below it to standardize and simplify control and monitoring of the motors coupled to the MCC. Thus, the PLC program layer 204 provides a programmatic interface to the hardware layer 202, and the HMI program layer 206 provides a programmatic interface to the PLC program layer 204. In other words, use of the MCC of the present invention is simplified because knowledge of the details of interacting with the layer below the accessed layer is not required. The accessed layer takes care of those details and simply returns a requested value or effects execution of a requested action.

As discussed with reference to FIGS. 1 and 1A, the hardware includes an MCC 100 which may include a number of various different types of functional modules 110 operatively coupled to a PLC 124 via a network 112. Also as mentioned above, the MMC 100 may be coupled to an HMI device 208 (e.g., a computer terminal, a personal computer, etc.) via and external network 210. The external network 210 is adapted to allow data transfer between the HMI device 208 and the PLC 124. Note that in some embodiments, a plurality of MMCs 100 may be coupled to and controlled via one or more HMI devices 208 even though only one MCC 100 and one HMI device 208 are shown in FIG. 2. Also note that in some embodiments, the functional modules 110 within the MCC 100 may operate as network slaves to the PLC 124 which may operate as a network master. In alternative embodiments, the network 112 may be implemented as a peer to peer network wherein each node functions as a peer on the network 112.

The PLC program layer 204 includes a data management process 212 that may be embodied as a program which executes on the PLC 124 and is operative to store and retrieve data about the operation of the functional modules 110. The data management process 214 communicates with the MCC 100 and the functional modules 110 via a logical network connection 214. In other words, logical network connection 214 logically couples the data management process 214 running on the PLC 124 and the functional modules 110 via the physical network 112.

The data management process 214 also stores the data about the operation of the functional modules 110 in the PLC 124 memory but organized in data structures 216 that correspond to the functional modules 110. Examples of these data structures 216 are illustrated below with respect to FIGS. 6A to 6C. The memory space of the PLC 124 that stores the data structures 216 for the data management process 212 may be mapped to the functional modules 110 so that known memory locations defined by the data structures 216 reflect the status of monitored parameters of the functional modules 110 in real time. Likewise, control of the functional modules 110 may be implemented by writing values to known memory locations defined by the data structures 216 that correspond to input parameters to the functional modules 110.

The HMI program layer 206 communicates values stored in the data structures 216 via logical connections 218 to a human operator and/or to an interface program 220 that executes on the HMI device 208. The data may be displayed on the HMI device 208 by the interface program 220 in a format easily comprehensible by an operator. In addition, the interface program 220 is adapted to receive input from an operator and to communicate the operator's selections to the PLC 124 via the data management process 212. For example, an operator can configure a functional module for a particular motor controlled and monitored by a soft start functional module 110 by, for example, activating a graphical user interface control on the HMI device 208 which is logically coupled to a configuration parameter within the data structure 216 that corresponds to the soft start functional module 110.

Although the system 200 allows for the abstraction and standardization of the functional modules 110, the response time for both control and monitoring of the functional modules desirably remains deterministic and consistent. Thus, the system 100 of the present invention is implemented as a hard real-time operating system (RTOS) which, despite the abstraction layers, can serve requests received via the interface program 220 in nearly real-time.

In operation, the data management process 212 retrieves data from the MCC via the network and saves the data in the PLC 124 internal memory. The HMI interface program 220 retrieves the data for the functional modules 110 from the PLC 124 via the external network 210 and then displays this data on the HMI device 208 (e.g., on a video screen) for the operator. In addition, display and control of the data management process 212 executing on the PLC 124 is available. The present invention is adapted to facilitate both the HMI program layer 206 and the PLC program layer 204 to react to and display data from only the functional modules 110 actually installed in the MCC 100. In other words, a missing or inoperative functional module 110 will not cause an irrecoverable error that requires an operator intervention to continue or restart operation. In addition, the system architecture 200 is adapted to function with a wide variety of HMI programs from various manufactures without requiring propriety knowledge of the MCC 100 or the data management process 212.

Figure 3:
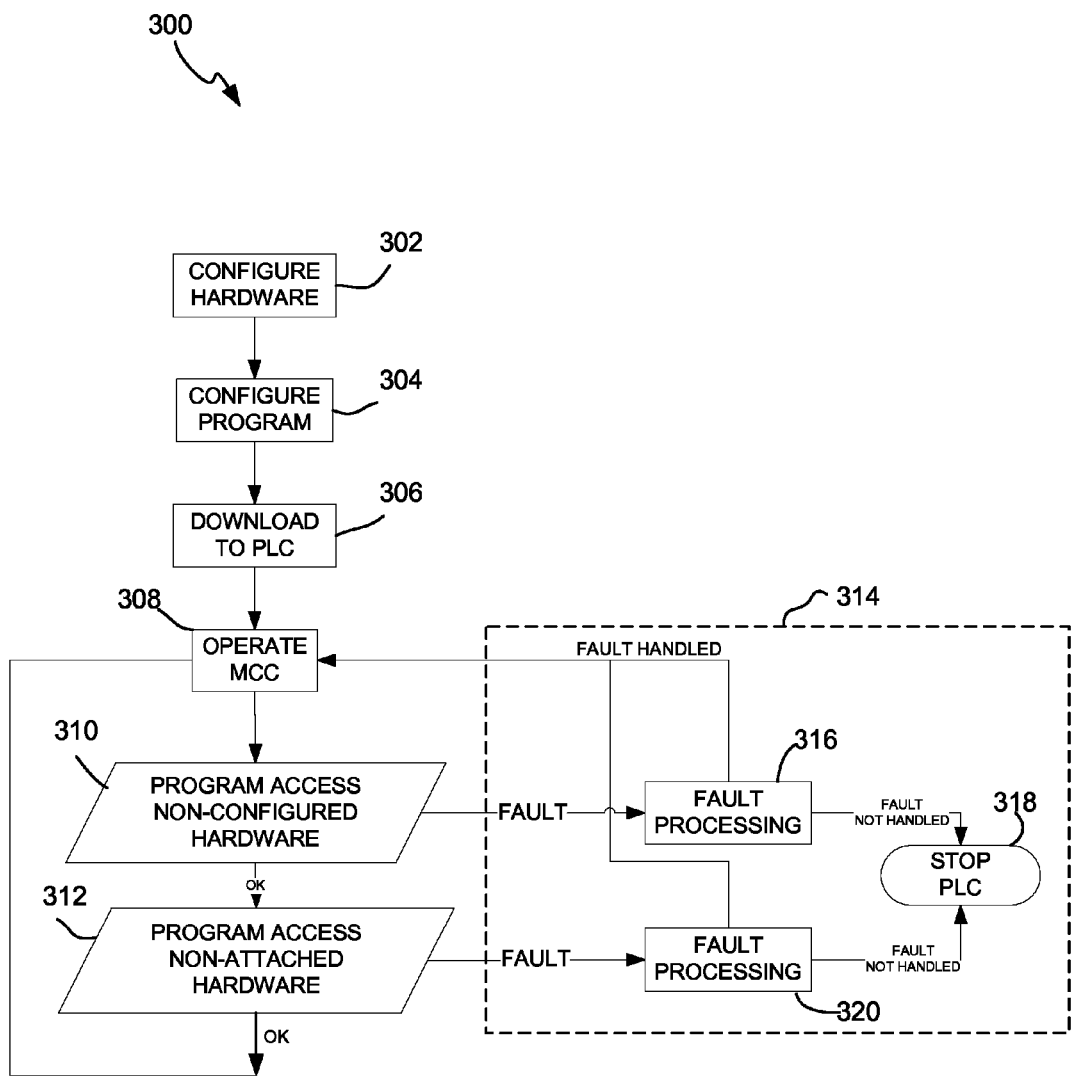
FIG. 3 is a flow chart depicting a conventional method of operating a conventional programmable logic controller according to the prior art.

Turning now to FIG. 3, a flow chart depicting operation of a conventional PLC according to the prior art is depicted. Prior art MCCs require the creation of a PLC program specific to the MCC. In other words, prior art PLCs need to be custom programmed with software that matches the particular functional modules used in the particular MCC. In Steps 302, 304, and 306, the hardware configuration of the functional modules connected to the PLC and the programming in the PLC custom to that hardware configuration are downloaded into the PLC for the specific MCC. In Step 308, operation of the MCC is started. If programming has been downloaded for functional modules that are not actually present in the hardware configuration (e.g., a wrong configuration), a software and/or hardware fault is generated in the PLC in Step 310, which may result in the PLC stopping operation entirely in a fault handling process 314 which includes Steps 316 and 318. If the hardware configuration contains a definition of functional modules that are not actually present on the network, a software and/or hardware fault is generated in Step 312 that may result in the PLC stopping operation entirely in the fault handling process 314 which includes Steps 320 and 318.

The inability of prior art systems to identify what hardware is present and verify that the hardware is properly configured inhibits prior art systems from being able to use a single PLC program that adapts to the configured hardware. In fact, due to the lack of a single adaptable PLC program, operators are typically forced to create a "template" PLC program, then modify the hardware configuration and the PLC programming to match the hardware configuration.

Figure 4:
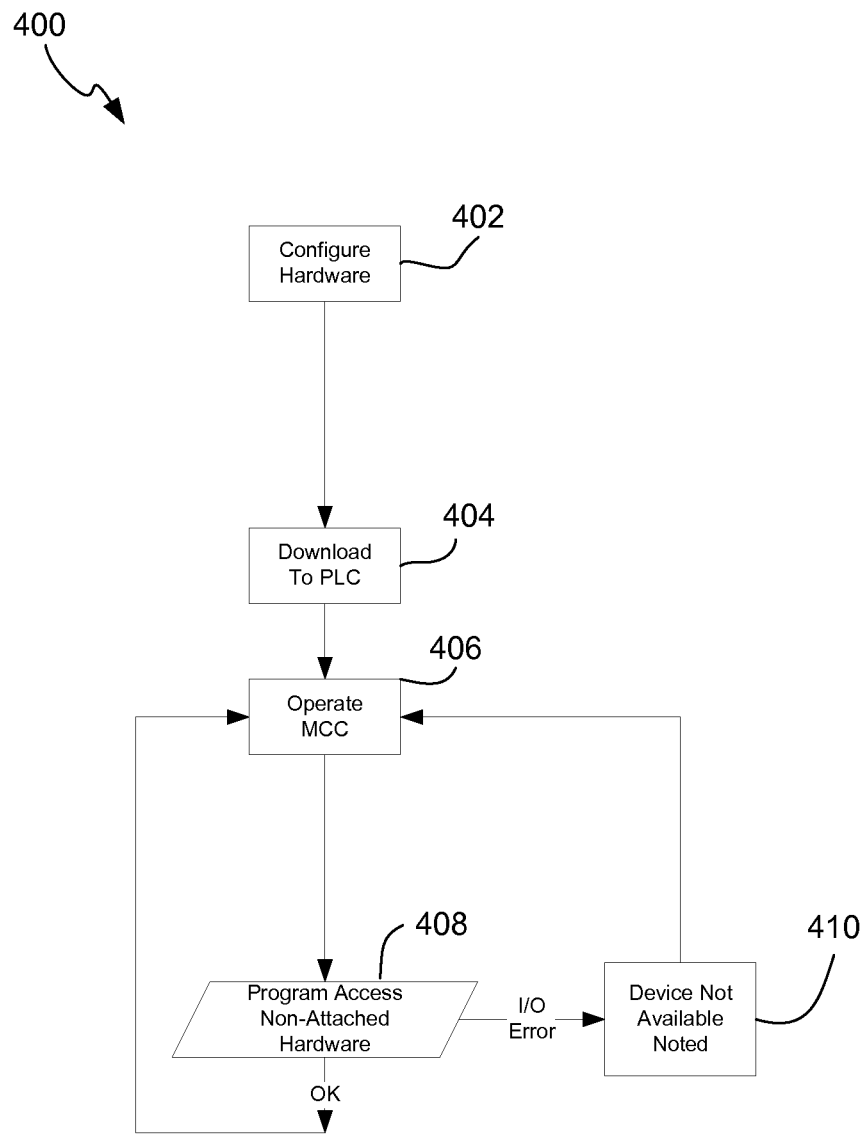
FIG. 4 is a flow chart depicting an example method of operating a programmable logic controller according to some embodiments of the present invention.

Turning to FIG. 4, a method 400 of operating an MCC according to the present invention is provided. The present invention provides a single standardized PLC program that is able to dynamically configure itself to match the hardware configuration of the MCC. In Step 402, the hardware configuration for all attached functional modules is defined. In some embodiments, the hardware configuration for all installed functional modules may be determined automatically based on, for example, functional module identifiers. In Step 404, the hardware configuration is downloaded to the PLC. Notably, the step of determining PLC programming custom to the hardware configuration (Step 304 in FIG. 3) and downloading the programming is not required in the method 400 of the present invention.

In Step 406, upon booting or restarting, operation of the MCC begins. The PLC program interrogates the hardware configuration, then configures the resident PLC program for operation with the hardware that is defined in the configuration. The PLC program uses the hardware configuration to draw upon a library of data structures that include the details for each type of functional module encountered. The appropriate data structures and associated program is selected and the resident PLC program configures itself. Notably, the present invention eliminates step 310 (FIG. 3) and the fault handling process 314 (FIG. 3) of the prior art. Since the PLC program of the present invention configures itself to match the configuration of the hardware, the prior art software required to detect and process faults that result in requiring halting operation are eliminated. If a functional module that is configured but not actually found on the network is detected in Step 408, an I/O error is noted for indication to a monitoring system, but the PLC program continues operation without faulting by looping back to Step 406.

The present invention thus provides several advantages to operators of MCCs. The PLC program no longer requires customized programming and thus, operators have a standardized interface for all their applications. This means that the number of PLC programs that need to be maintained for backup/security reasons is limited. Servicing is simplified because the hardware configuration can be quickly and automatically be created with the standard PLC program. This insures a short downtime even in the event of severe hardware failure requiring immediate replacement of multiple functional modules. The ability of the PLC to read its own hardware configuration during boot-up/power-on facilitates these advantages and allows the elimination of software requirements such as non-standard fault handling routines and customized programming for the PLC.

Figure 5:
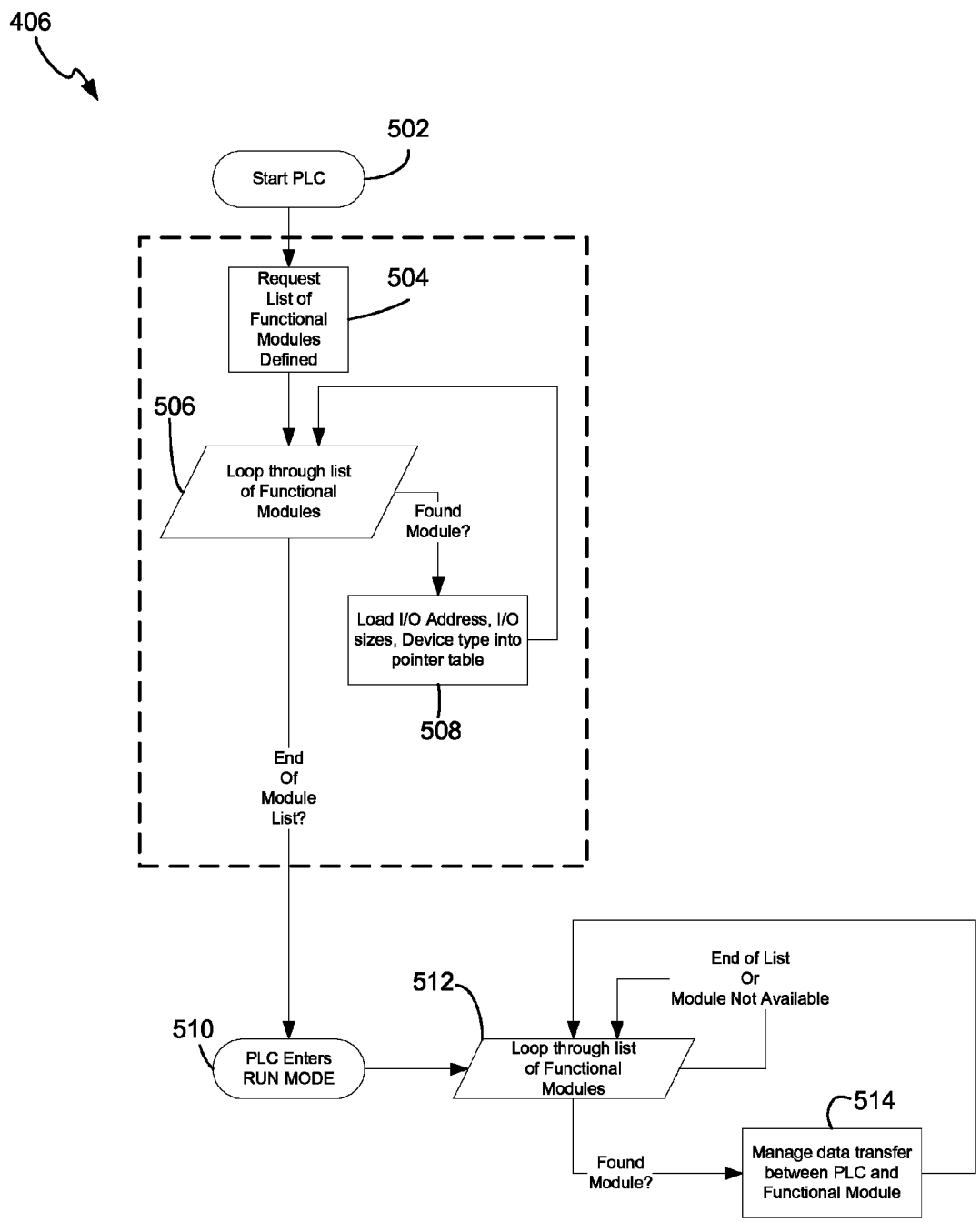
FIG. 5 is a flow chart depicting details of the Operate MCC Function of the flow chart of FIG. 4 according to some embodiments of the present invention.

Turning to FIG. 5, the details of operating the MCC in Step 406 of FIG. 4 are illustrated. In Step 502, the PLC is started. In Step 504, the PLC requests the list of functional modules installed in the MCC. This is part of the hardware configuration crated in Step 402 (FIG. 4). In Step 506, the PLC loops through the list of functional modules. In Step 508, for each module listed in the hardware configuration, a data structure is selected from a library of data structures and a pointer table is created in the PLC memory defining the valid functional modules on the network to process and how to process them. The table is populated with, for example, an input/output (I/O) address of the functional module, an I/O size of the functional module, and a device type identifier. This is repeated for each functional module until the end of the functional module list is reached, at which point the PLC enters into run mode in Step 510. In run mode, the PLC actively scans data from all of the attached functional modules. In Step 512, the PLC loops through the list of functional modules. For each module found, the PLC software manages the data transfer between the PLC and the functional module in Step 514. If a module is not available, the PLC goes to the next module. If the end of list is reached, the PLC loops back to the beginning of the list.

Figures 6A, 6B, 6C:
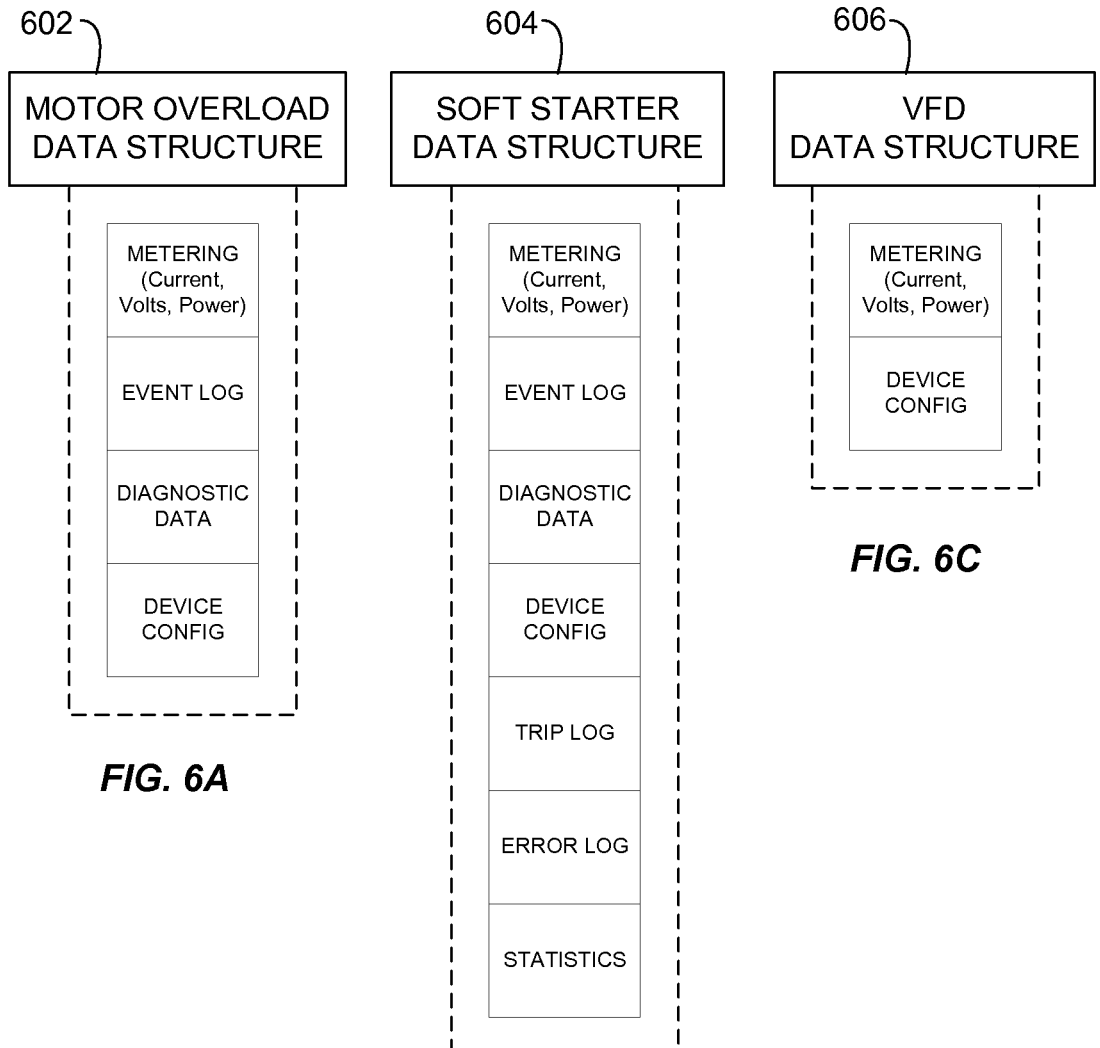
FIGS. 6A, 6B, and 6C are block diagrams depicting a representation of example data structures for use with various types of functional modules according to some embodiments of the present invention.

Turning to FIGS. 6A through 6C, three example data structures 602, 604, 606, for different types of functional modules are illustrated. These data structures 602, 604, 606 are complex data types that are updated during each read of data from the corresponding functional module. In addition, in some embodiments, configuration data may be sent back to the functional module from the PLC to adjust the configuration without the use of external programming software. The example data structure 602 of FIG. 6A is for use with a motor overload functional module. This example data structure 602 includes fields for storing metering data (e.g., current, voltage, power, etc.); an event log; diagnostic data, and device configuration data. The example data structure 604 of FIG. 6B is for use with a soft starter functional module. This particular example data structure 604 includes fields for storing metering data (e.g., current, voltage, power, etc.); an event log; diagnostic data; device configuration data; a trip log; an error log; and statistical data. The data structure 605 of FIG. 6C is for use with a variable frequency drive (VFD) functional module. This particular example data structure 606 includes fields for storing metering data (e.g., current, voltage, power, etc.); and device configuration data. Numerous other data structure formats may be used and many additional data structures for different types of functional modules may be employed.

The embodiments of the teachings have been described in an illustrative manner. It is to be understood that the terminology, which has been used, is intended to be in the nature of words of description rather than of limitation.

Many modifications and variations of the embodiments are possible in light of the above teachings. Therefore, within the scope of the appended claims, the embodiments can be practiced other than as specifically described.

The invention claimed is:

1. A method of operating a motor control center comprising:
   determining a hardware configuration;
   downloading the hardware configuration to a programmable logic controller;
   configuring a program to run on the programmable logic controller based on the hardware configuration, the hardware configuration includes one or more function module installed in the motor control center, the programmable logic controller is adapted to determine a status of the one or more functional module in real time from a memory space of stored operational data of the one or more functional module; and
   executing the program.

2. The method of claim 1 wherein the one or more functional module is from the group consisting of one of a motor overload module, a variable frequency drive module, or a soft start module that is installed in the motor control center.

3. The method of claim 2 wherein the functional modules are addressable by the programmable logic controller using a logical address.

4. The method of claim 3 wherein the programmable logic controller is not aware of a physical location or address of the functional modules.

5. The method of claim 1 wherein the programmable logic controller stores the operational data of the one or more functional module in a memory by organizing the operational data into at least one data structure that correspond to the one or more functional module.

6. The method of claim 5 wherein the programmable logic controller stores the at least one data structure in a known memory location, so that the memory space of the known memory location defined by the data structure reflect the status of at least one monitored parameter of the one or more function module in real time.

7. The method of claim 1 wherein the one or more functional module installed in the motor control center include communications ports for coupling to a network within the motor control center.

8. The method of claim 1 wherein configuring the program includes accessing a library of data structures, each data structure corresponding to a type of functional module for use within the motor control center.

9. The method of claim 1 wherein configuring the program includes generating a pointer table in a memory space of the programmable logic controller that defines valid functional modules accessible by the programmable logic controller.

10. The method of claim 9 wherein the pointer table is populated with at least one of an input/output address of the functional module, and input/output size of the functional module, and a device type identifier.

11. A motor control center system comprising:
a frame adapted to provide a plurality of functional module slots;
a busbar coupled to the frame and the functional module slots;
a network coupled to the frame and the functional module slots;
a programmable logic controller module adapted to couple to a functional module slot; and
a plurality of functional modules adapted to couple to functional modules slots,
wherein the programmable logic controller module includes a programmable logic controller adapted to:
receive a hardware configuration;
download the hardware configuration into a memory of the programmable logic controller;
configure a program to run on the programmable logic controller based on the hardware configuration, the hardware configuration includes the plurality of function modules installed in the motor control center, the programmable logic controller is adapted to determine a status of the one or more functional module in real time from a memory space of stored operational data of the plurality of functional modules; and
execute the program.

12. The motor control center system of claim 11 wherein the plurality of functional modules is from the group consisting of one of a motor overload module, a variable frequency drive module, or a soft start module that is installed in the motor control center.

13. The motor control center system of claim 12 wherein the programmable logic controller stores the operational data of the plurality of functional modules in a memory by organizing the operational data into at least one data structure that corresponds to the plurality of functional modules.

14. The motor control center system of claim 12 wherein the functional modules installed in the motor control center include communications ports for coupling to a network within the motor control center.

15. The motor control center system of claim 12 wherein the functional modules are addressable by the programmable logic controller using a logical address.

16. The motor control center system of claim 15 wherein the programmable logic controller is not aware of a physical location or address of the functional modules.

17. The motor control center system of claim 11 wherein configuring the program includes accessing a library of data structures, each data structure corresponding to a type of functional module for use within the motor control center.

18. The motor control center system of claim 11 wherein configuring the program includes generating a pointer table in the memory of the programmable logic controller that defines valid functional modules accessible by the programmable logic controller.

19. The motor control center system of claim 18 wherein the pointer table is populated with at least one of an input/output address of the functional module, and input/output size of the functional module, and a device type identifier.

20. A programmable logic controller module for a motor control center, the programmable logic controller module comprising:
a programmable logic controller adapted to:
receive a hardware configuration;
download the hardware configuration into a memory of the programmable logic controller;
configure a program to run on the programmable logic controller based on the hardware configuration, the hardware configuration defines one or more function module including a motor overload module, a variable frequency drive module, or a soft start module that are installed in the motor control center;
store operational data of the one or more functional module into at least one data structure that correspond to the one or more functional module, the programmable logic controller is configured to determine a status of the one or more functional module in real time from a memory space of stored operational data of the one or more functional module; and
execute the program.

21. The programmable logic controller module of claim 20 wherein the programmable logic controller stores the at least one data structure in a known memory location, so that the memory space of the known memory location defined by the data structure reflect the status of at least one monitored parameter of the one or more function module in real time.

* * * * *